US010329132B2

(12) United States Patent
Cui et al.

(10) Patent No.: US 10,329,132 B2
(45) Date of Patent: Jun. 25, 2019

(54) ELEVATING LIFT WITH A STABILIZED MOVABLE BASE

(71) Applicants: Kan Cui, Mercer Island, WA (US); Margaret K. Liu, Mercer Island, WA (US); Samuel K. Liu, Mercer Island, WA (US)

(72) Inventors: Kan Cui, Mercer Island, WA (US); Margaret K. Liu, Mercer Island, WA (US); Samuel K. Liu, Mercer Island, WA (US)

(*) Notice: Subject to any disclaimer, the term of this patent is extended or adjusted under 35 U.S.C. 154(b) by 0 days.

(21) Appl. No.: 15/989,331

(22) Filed: May 25, 2018

(65) Prior Publication Data
US 2019/0127193 A1 May 2, 2019

Related U.S. Application Data

(62) Division of application No. 15/801,136, filed on Nov. 1, 2017, now Pat. No. 10,005,652.

(51) Int. Cl.
B66F 11/04 (2006.01)
E04G 1/22 (2006.01)
E04G 1/24 (2006.01)
A47C 9/10 (2006.01)

(52) U.S. Cl.
CPC ............. B66F 11/04 (2013.01); A47C 9/105 (2013.01); E04G 1/22 (2013.01); E04G 1/24 (2013.01); B60G 2200/322 (2013.01); B60G 2204/46 (2013.01); B60G 2400/63 (2013.01); E04G 2001/242 (2013.01)

(58) Field of Classification Search
CPC . A47C 9/105; B66F 11/04; E04G 1/22; E04G 1/24
See application file for complete search history.

(56) References Cited

U.S. PATENT DOCUMENTS 3,000,473 A * 9/1961 Reynolds ................ B66F 11/04
182/69.4
3,038,690 A * 6/1962 Alexio ..................... A47C 4/24
108/128
3,282,530 A * 11/1966 Rash ....................... B65H 49/30
242/127

(Continued)

FOREIGN PATENT DOCUMENTS

DE 9418112 U1 * 2/1995 ............. B66F 11/04
GB 1185657 A 3/1970

Primary Examiner — Colleen M Chavchavadze
(74) Attorney, Agent, or Firm — Richard C. Litman

(57) ABSTRACT

The elevating lift with a stabilized movable base includes a base with extendable legs that provide minimum to maximum adjustable stability during use and transport. A lift system is mounted on the base, and a platform assembly is mounted on top of the lift system for selective raising or lowering. Each extendable leg supports a caster, rendering the base movable, and selective extension and retraction of the legs adjusts the stability of the lift. The plurality of legs can be further driven to simultaneously rotate about the vertical axis to steer the lift. The stabilized movable base is further alternatively used in combination with a stool, providing minimum to maximum stability during use and transport of seating, and multiple elevating lifts may be used to support linked platform assemblies in various configurations.

10 Claims, 13 Drawing Sheets

(56) References Cited

U.S. PATENT DOCUMENTS

| | | | | |
|---|---|---|---|---|
| 3,871,478 A * | 3/1975 | Bushnell, Jr. | ........... | B66F 11/04 182/148 |
| 4,068,737 A * | 1/1978 | Lenz | ........... | B66F 11/04 182/146 |
| 4,390,080 A * | 6/1983 | Bushnell, Jr. | ........... | B66F 11/04 182/115 |
| 4,479,633 A * | 10/1984 | McCreery | ........... | B66B 9/04 254/93 R |
| 4,498,556 A * | 2/1985 | Garton | ........... | B66F 11/04 182/19 |
| 4,529,063 A * | 7/1985 | Kishi | ........... | B66F 11/04 182/141 |
| 4,619,346 A * | 10/1986 | Deguerry | ........... | B66F 11/04 182/141 |
| 5,062,606 A * | 11/1991 | Hoshino | ........... | F16M 11/28 248/169 |
| 5,111,907 A * | 5/1992 | Kishi | ........... | B66F 11/04 182/116 |
| 5,203,425 A * | 4/1993 | Wehmeyer | ........... | B66F 11/04 182/113 |
| 5,803,204 A * | 9/1998 | White | ........... | B66F 11/04 182/148 |
| 6,551,050 B1 | 4/2003 | Kallevig et al. | | |
| 7,195,102 B2 * | 3/2007 | Shai | ........... | E04G 1/22 182/230 |
| 9,140,402 B2 * | 9/2015 | Anderson | ........... | F16M 11/04 |
| 9,228,649 B1 * | 1/2016 | Cui | ........... | A47C 7/006 |
| 9,681,754 B2 * | 6/2017 | Avery | ........... | A47C 9/105 |
| 9,701,525 B1 * | 7/2017 | Cui | ........... | B66F 11/04 |
| 10,005,652 B1 * | 6/2018 | Cui | ........... | A47C 9/105 |
| 2017/0088170 A1 * | 3/2017 | Cui | ........... | A47C 7/006 |

* cited by examiner

ELEVATING LIFT WITH A STABILIZED MOVABLE BASE

CROSS REFERENCE TO RELATED APPLICATIONS

This application is a division of Ser. No. 15/801,136, filed Nov. 1, 2017, now pending.

BACKGROUND

1. Field

The disclosure of the present patent application relates to lift devices, and particularly to an elevating lift with a stabilized movable base, allowing for simultaneous and stable deployment and collapse of stabilizing legs.

2. Description of the Related Art

Many lifting devices exist to assist users to gain access to elevated areas difficult to reach through most conventional means, such as stretching towards maximum reach of the user's physical ability, ladders, and the like. In the case of manual reaching, any activity performed while stretching to reach the desired area is rather limited by the user's physical endurance in maintaining the stretched position. Most ladders, while useful, tend to be rather lackluster in terms of stability due to their design and function where the ladder leans against a surface with only the legs and abutting portions providing the necessary stability. Depending on the extent of the ground surface level, the stability of a ladder may be compromised if the ground surface is uneven, which requires buttressing by additional features on the ladder or an additional person.

Powered lifters are also available for more heavy duty or industrial applications. These types of devices provide great utility due to the weight that can be supported, which allows for a larger amount of supplies, tools, and/or cargo to be carried, since they have a relatively large base supporting the platform and lift system. However, these types of lifters tend to be rather large, employ relatively complex lift systems, such as a scissor lift, and/or utilize a single telescoping mast that may lose structural integrity or provide reduced stability over time. Moreover, most of these power lifters tend to be unsuitable for personal applications due to the relatively large and cumbersome design. In light of the above, it would be a benefit in the art of lift devices to provide a lift of suitable size and configuration for personal use with a relatively robust and simple lift system. Thus, an elevating lift with a stabilized movable base solving the aforementioned problems is desired.

SUMMARY

The elevating lift with a stabilized movable base includes a base with extendable legs that provide minimum to maximum adjustable stability during use and transport. The elevating lift with a stabilized movable base includes a movable base, having opposed upper and lower surfaces, and a housing mounted on the upper surface of the movable base. The housing has an open upper end and at least one sidewall. A telescoping cage assembly is further provided. The lower end of the telescoping cage assembly is secured within the housing. A platform assembly is mounted on the upper end of the telescoping cage assembly.

An annular collar is slidably mounted about the housing. A plurality of upper mounts and a plurality of lower mounts are each disposed on the annular collar. A plurality of legs are further provided. Each leg includes an upper bar, having opposed upper and lower ends, the upper end being pivotally secured to a respective one of the plurality of upper mounts. Each leg further includes a lower bar, having opposed upper and lower ends, the upper end being pivotally secured to a respective one of the plurality of lower mounts. A hollow leg housing receives and covers the upper and lower bars.

A plurality of casters are also provided, the lower ends of the upper and lower bars being respectively pivotally secured to a corresponding caster support of each caster. The elevating lift with a stabilized movable base further includes a plurality of struts, each having opposed upper and lower ends. The upper end of each strut is pivotally secured to a central portion of a corresponding one of the plurality of legs. The lower end of each strut is pivotally secured to a lower end of the housing.

In an alternative embodiment, additional simultaneous, selective rotational movement of the legs is provided. In this embodiment, the elevating lift with a stabilized movable base further includes an eccentric collar slidably mounted about the housing above the annular collar. A rotating cuff is mounted about the housing above the eccentric collar. The rotating cuff is fixedly secured to the eccentric collar, the rotating cuff being selectively rotatable about the housing. A plurality of auxiliary mounts are disposed on the eccentric collar. A plurality of auxiliary bars are further provided, each auxiliary bar having opposed upper and lower ends. The upper end is pivotally secured to a respective one of the plurality of auxiliary mounts, and the lower end is pivotally secured to a respective one of the caster supports of the plurality of casters. In this embodiment, further rotational freedom about the vertical axis is possible. A rotational linkage is provided. The rotational linkage links the lower end of the auxiliary bar to the caster support, driving simultaneous rotation of all casters in parallel, allowing all casters to be simultaneously steered in the same direction.

In a further alternative embodiment, the stabilizing base is used in combination with a stool. The stool includes a movable base having opposed upper and lower surfaces. A vertical support replaces the telescoping cage assembly of the previous embodiments, the vertical support having an upper end and a lower end. The lower end is mounted on the movable base. A seat replaces the platform assembly of the previous embodiments and is mounted on the upper end of the vertical support.

An annular collar is slidably mounted about the vertical support. A plurality of upper mounts and a plurality of lower mounts are disposed on the annular collar. A plurality of legs are further provided, each leg including an upper bar having opposed upper and lower ends, the upper end being pivotally secured to a respective one of the plurality of upper mounts. Each leg further includes a lower bar having opposed upper and lower ends, the upper end being pivotally secured to a respective one of the plurality of lower mounts. A hollow leg housing covers the upper and lower bars.

A plurality of casters are provided, the lower ends of the upper and lower bars being respectively pivotally secured to a corresponding caster support of each caster. Similar to the previous embodiments, a plurality of struts are also provided, each strut having opposed upper and lower ends. The upper end of each strut is pivotally secured to a central portion of a corresponding one of the plurality of legs, and the lower end of each strut is pivotally secured to the movable base.

Similar to the previous embodiment, in which simultaneous rotation of the legs is effected, an eccentric collar is slidably mounted about the vertical support above the annular collar. A plurality of auxiliary mounts are disposed on the eccentric collar. A plurality of auxiliary bars are further provided, each having opposed upper and lower ends. The upper end is pivotally secured to a respective one of the plurality of auxiliary mounts, and the lower end is pivotally secured to a respective one of the caster supports of the plurality of casters. In this embodiment, further rotational freedom about the vertical axis is possible, with a rotational linkage being provided. The rotational linkage links the lower end of the auxiliary bar to the caster support, driving simultaneous rotation of all casters in parallel, allowing all casters to be simultaneously steered in the same direction These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
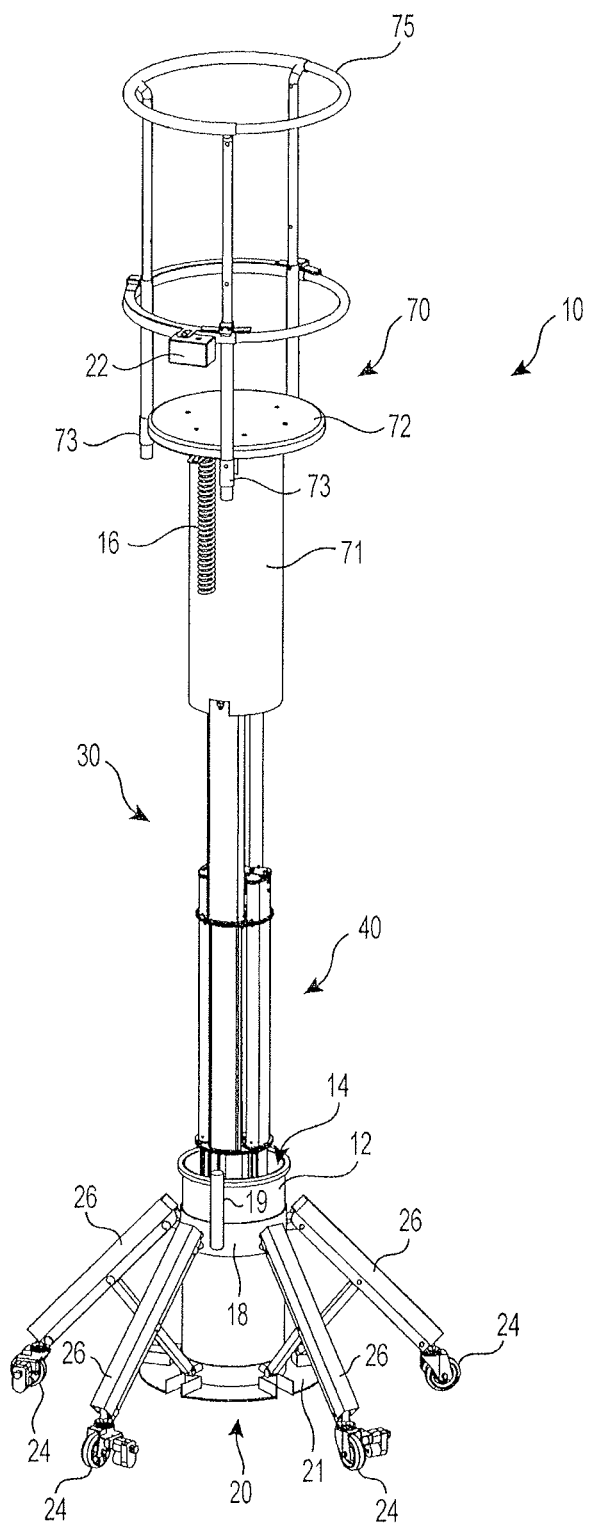
FIG. 1 is a perspective view of a first embodiment of an elevating lift with a stabilized movable base, shown in a deployed configuration.
Figure 2:
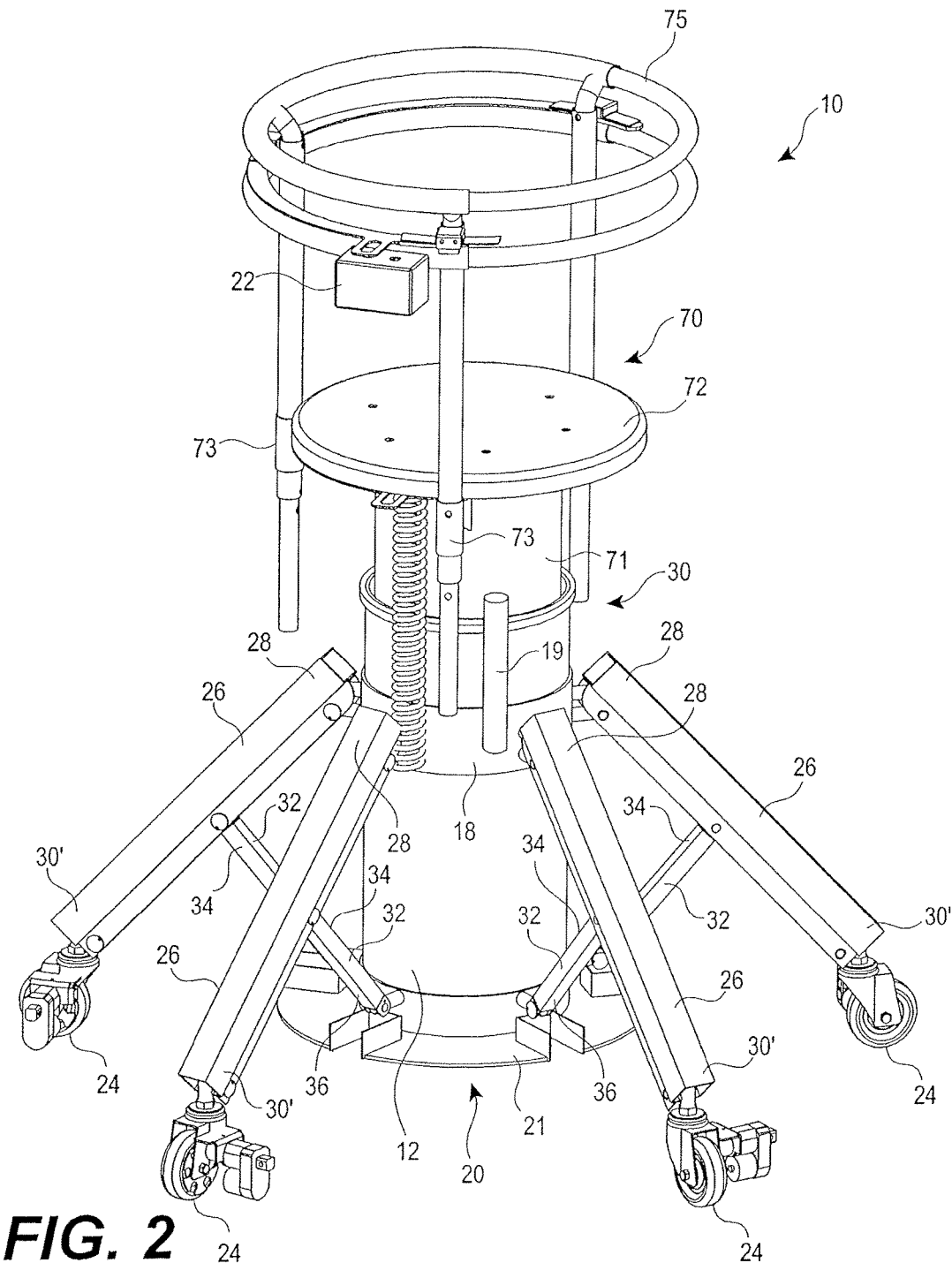
FIG. 2 is a perspective view of the elevating lift of FIG. 1, shown in a retracted configuration.

As shown in FIGS. 1 and 2, the elevating lift with a stabilized movable base, designated generally as 10, includes a stabilizer base assembly 20, a selectively extendable lift system 30 extending upward from the stabilizer base assembly 20, and a platform assembly 70 coupled to the top of the lift system 30. The stabilizer base assembly 20 supports the lift system 30 and includes a movable base 21.

A plurality of selectively extendable casters 24 are coupled to the movable base 21 to enable selective transport of the elevating lift 10 to a desired location. Although the movable base 21 is shown as being generally circular, it should be understood that the movable base 21 may have any desired or required shape or relative dimensions, depending on the particular application.

The platform assembly 70 provides space to support a user and any necessary supplies and equipment. The platform assembly 70 includes a platform base 71, a level platform 72, and a guardrail assembly 75. As shown, the platform base 71 may be configured as an elongate sleeve covering the height of a telescoping cage assembly 40 when in a collapsed state, as shown in FIG. 2. As shown in FIGS. 1 and 2, a housing 12 having an open upper end 14 is mounted on the movable base 21. When in the collapsed state of FIG. 2, the telescoping cage assembly 40 and at least a lower portion of platform base 71 are received within an open interior region of the housing 12. The telescoping cage assembly 40 may be any suitable type of telescopic support used in elevating lifts, as are well known in the art. An example of such a telescoping support is shown in U.S. Pat. No. 9,701,525 (the '525 patent), which is hereby incorporated by reference in its entirety.

The platform 72 is constructed to provide at least two degrees of adjustable positioning movement, the first being elevated positioning via selective extension and retraction of the telescoping cage assembly 40, and the second being rotational or angular positioning about the central axis of the lift system 30. This enables the user to set the desired height and rotation as required to reach the work area. Although a disc shape is preferred, the platform 72 may be constructed in any shape suitable for supporting a user(s), supplies and/or equipment, e.g., square, rectangular, and other geometric shapes. One or more mount collars 73 extend radially from the periphery of the platform 72 to enable slidable mounting of the guardrail assembly 75.

The stabilizer base assembly 20 supports the lift system 30, and the lift system 30 extends axially therefrom. The lift system 30 enables selective, positive elevation of the platform assembly 70 between the lowermost position, shown in FIG. 2, the highest position, shown in FIG. 1, and any position therebetween. As is well known in the art, and as shown in the exemplary system of the '525 patent, the lift system 30 includes the telescoping cage assembly 40, a drive assembly, and a drive train coupled to the telescoping cage assembly 40, the drive assembly facilitating raising and lowering of the platform assembly 70 upon selective activation of the drive assembly. A spring 16, shock absorber, support or the like is provided to prevent excessive downward movement of platform assembly 70 during collapsing of the elevating lift 10.

As shown in FIGS. 1 and 2, an annular collar 18 is slidably mounted about the housing 12. Vertical positioning of the annular collar 18 is selectively controllable by a linear actuator 19 or the like, which may be controlled by any suitable type of user interface, such as exemplary control box 22. As best seen in FIG. 2, a plurality of legs 26 are provided for supporting the casters 24. Each leg 26 has an upper end 28, which is pivotally secured to the annular collar 18, and a lower end 30', which is pivotally attached to a respective one of the casters 24. A plurality of struts 32 are further provided, each strut 32 having an upper end 34 and a lower end 36. The upper end 34 of each strut 32 is pivotally secured to a corresponding one of the legs 26, and the lower end 36 of each strut 32 is pivotally secured to the movable base 21.

Figure 3:
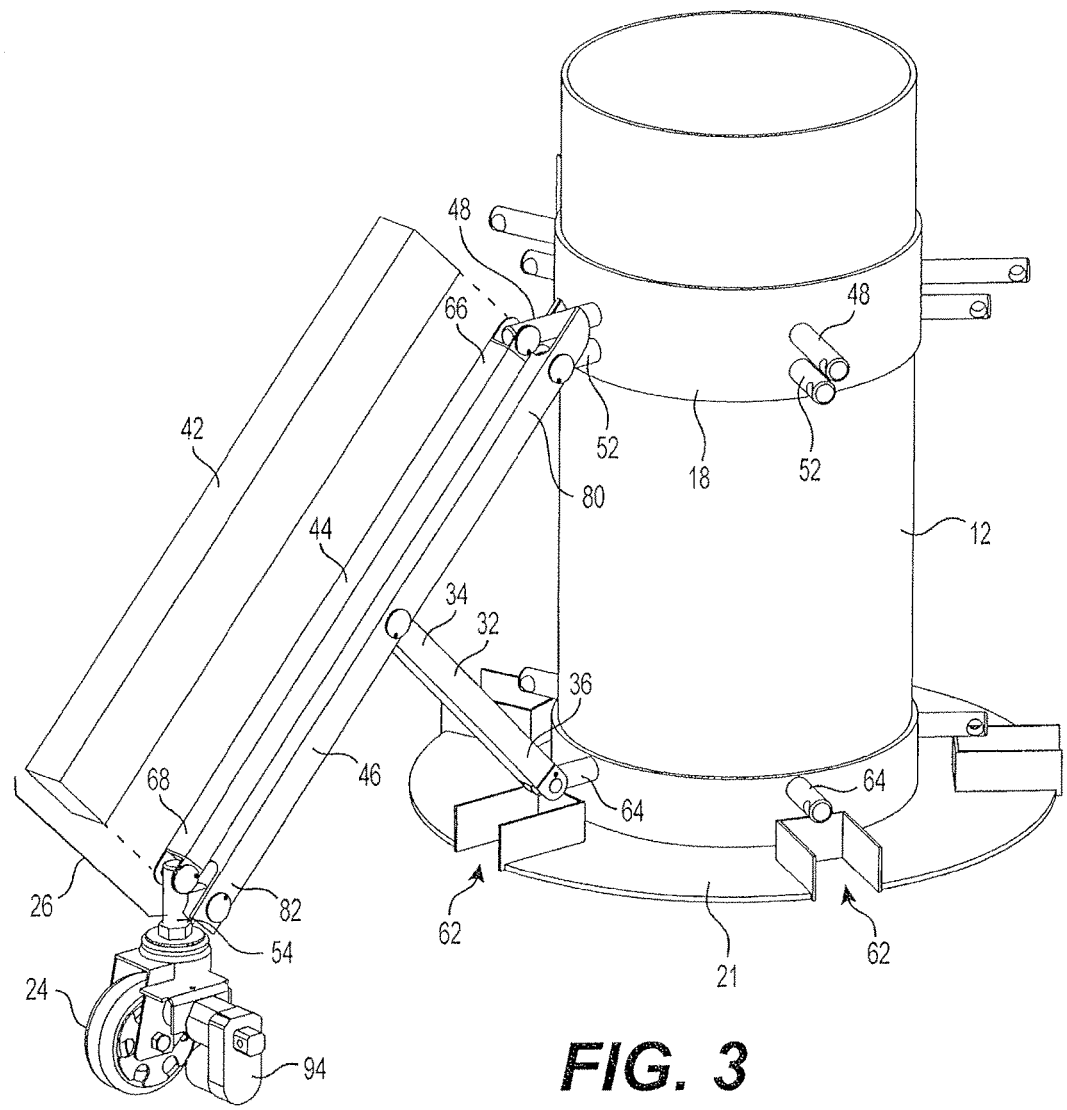
FIG. 3 is a partial perspective view of the elevating lift of FIG. 1.

In use, as the linear actuator 19 pushes the annular collar 18 downward, the downward movement of the collar 18 causes the legs 26 to extend radially outward, increasing the area of the support base defined by the casters 24. For purposes of simplification and clarity, FIG. 3 shows only a single leg 26 secured to the housing 12 on the movable base 21. As shown in FIG. 3, each leg 26 preferably includes an upper bar 44 and a lower bar 46, which are preferably contained within a protective housing 42. For each leg 26, corresponding upper and lower mounts 48, 52, respectively, are secured to the annular collar 18. The upper end 66 of the upper bar 44 is pivotally secured to the upper mount 48, and the upper end 80 of the lower bar 46 is pivotally secured to the lower mount 52. The lower ends 68, 82 of the respective upper and lower bars 44, 46 are each pivotally secured to a swivel caster head 54 of a corresponding caster 24. The swivel head of each caster 24 includes a vertical stem having a transverse bore defined therein for insertion of a pivot pin connecting the lower end of the upper bar to the caster 24, and a knob or lug extending perpendicular to the base of the stem, the lug also having a transverse bore defined therein for insertion of a pivot pin connecting the lower end of the lower bar to the caster 24. Thus, the internal structure of each leg 26 defines a four-bar parallelogram linkage, the upper and lower bars 44, 46 being one pair of parallel links, the annular collar 18 between the collar mounts 48, 52, and the swivel caster head 54 being the other pair of parallel links. The four-bar parallelogram linkage keeps the stems of the swivel caster assemblies 24 vertical as the legs 26 extend and retract, since there is no fixed structure similar to, e.g., a rigid vertical chair leg, a platform, etc. that the stem of the caster 24 can be inserted into to keep the swivel fork vertical when the legs 26 are retracted and extended. The legs 26 pivot between a nearly vertical position for transport and storage, and a nearly horizontal position when the telescoping cage 40 is extended to raise the platform 70 to maximum height, the horizontal position providing maximum stability. Mounts 64 are provided on the lower end of the housing 12 for pivotal attachment of the lower ends 36 of the struts 32, as shown. For maximum extension of the legs 26, a plurality of slots or recess 62 may be defined in the movable base 21, as shown, allowing for horizontal, or near horizontal, extension of the legs 26 in the radial direction.

Figure 4:
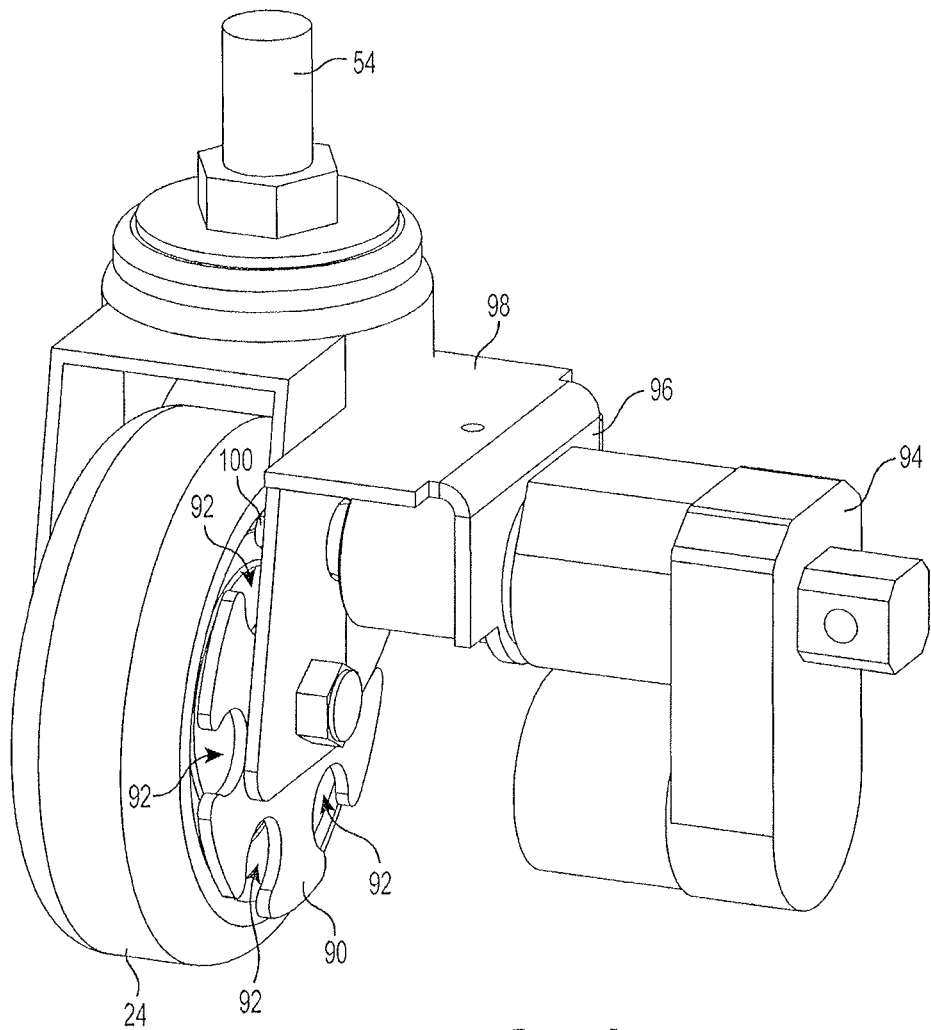
FIG. 4 is a perspective view of a caster assembly of the elevating lift of FIG. 1.

As shown in FIG. 4, a locking disc 90 is preferably provided for each caster 24, allowing for selectively controlled locking of each caster 24. Each locking disc 90 has a plurality of slots or recesses 92 formed in the circumference, as shown. The locking disc 90 is mounted on one side of the wheel hub of the caster 24 and is fixed with respect thereto, such that the locking disc 90 rotates (or ceases to rotate) with the wheel hub. An electric motor screw linear actuator 94 or the like is mounted on a side panel 96 of the steering yoke 98. In order to lock the caster 24 in place, the screw linear actuator 94 pushes its locking head 100 through one of the slots 92 to prevent rotation of the caster 24. The electric motor screw linear actuator 94 may be under user control via control box 22 or the like.

Figure 13:
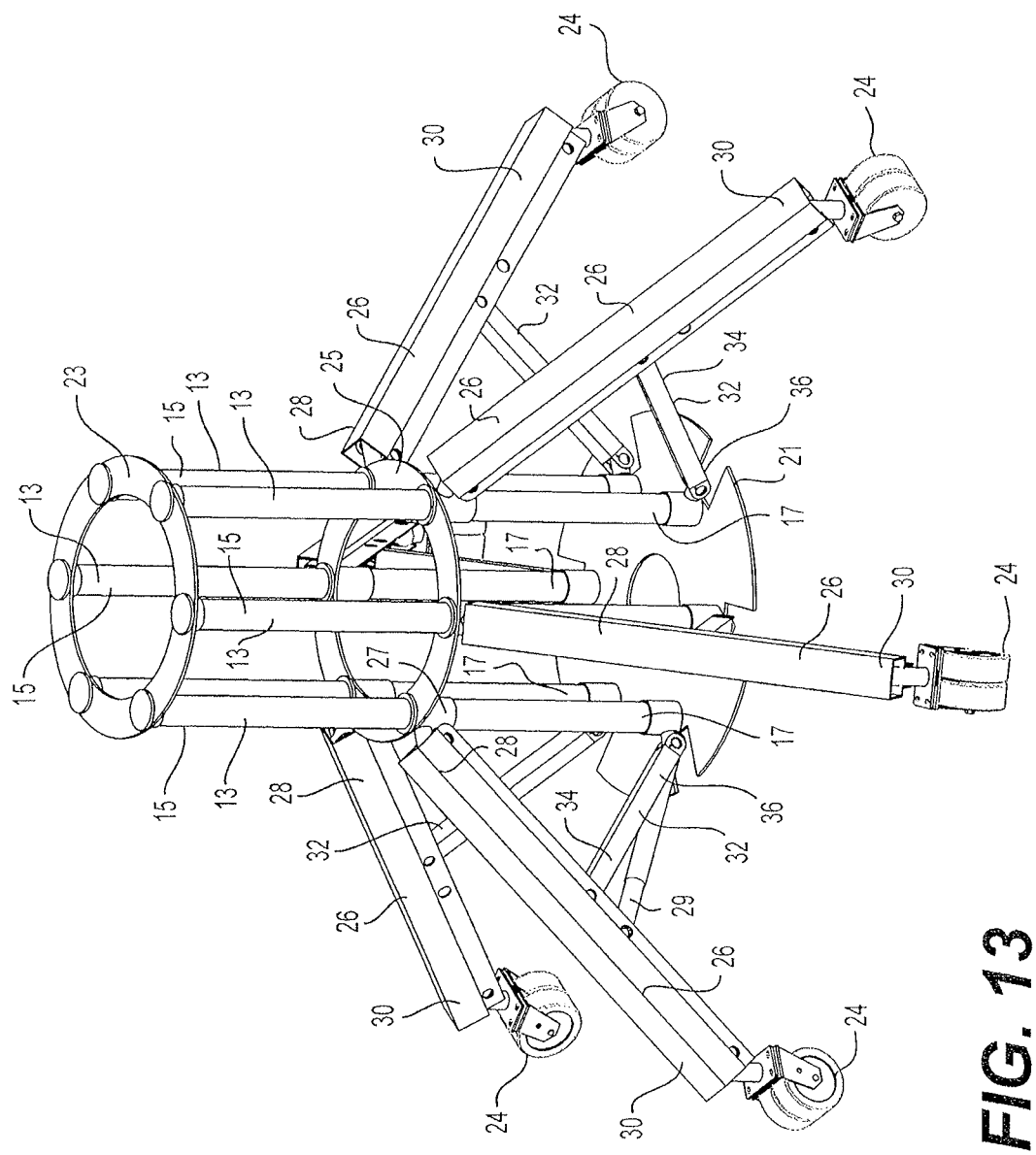
FIG. 13 is a partial perspective view of another alternative embodiment of an elevating lift with a stabilized movable base.
Figure 14:
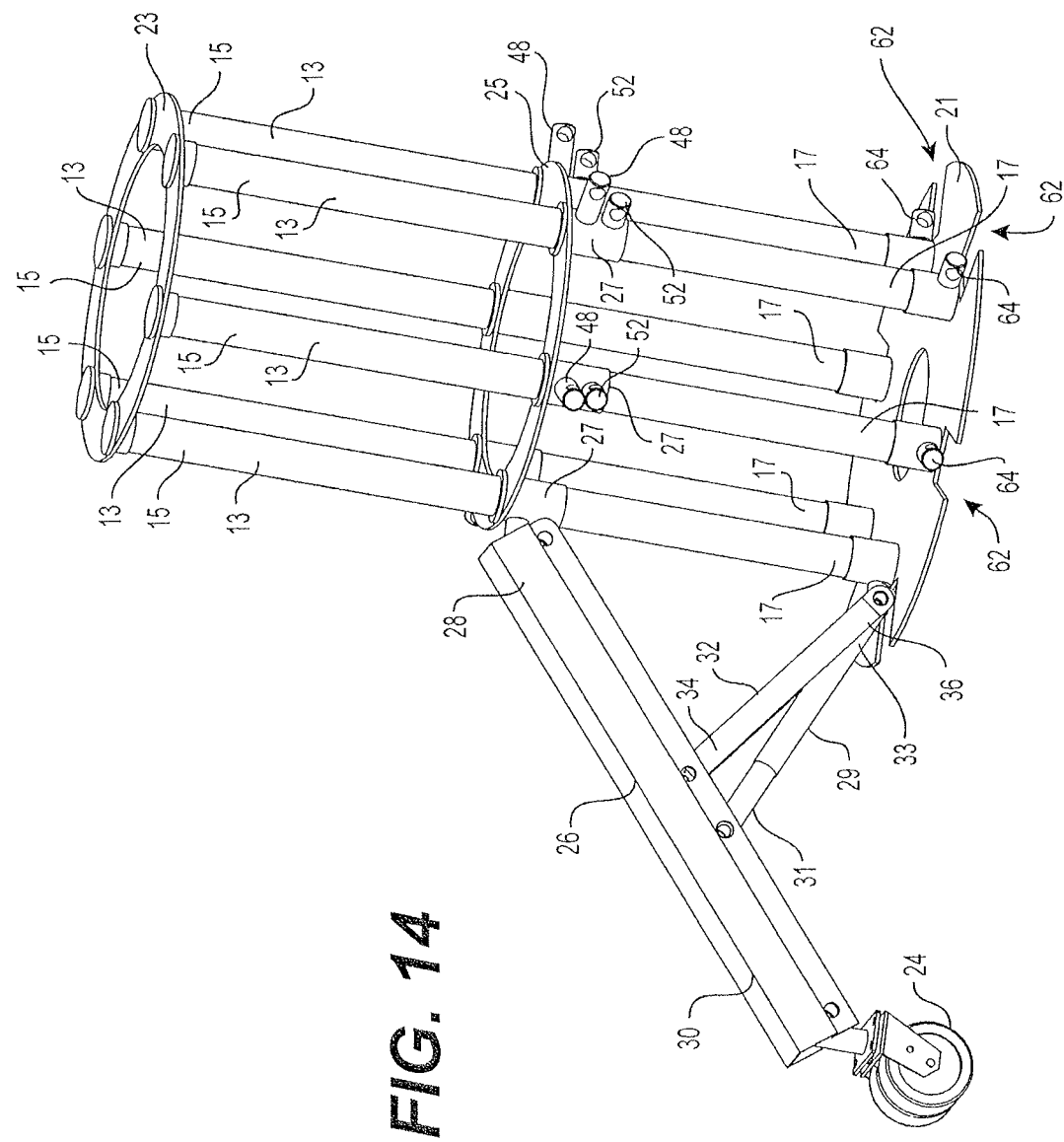
FIG. 14 is a partial perspective view of the elevating lift of FIG. 13.

The alternative embodiment of FIGS. 13 and 14 is similar to that of the embodiment of FIGS. 1-4. However, as shown, the housing 12 of the previous embodiment has been replaced by a plurality of vertically extending tubes 13, each having an upper end 15 and a lower end 17. The lower ends 17 of the vertically extending tubes 13 are mounted on the movable base 21, similar to the mounting of housing 12 on the movable base 21. The upper ends 15 of the vertically extending tubes 13 are secured together by an annular retainer 23, as shown, and the annular collar 18 is replaced by a sliding collar 25 in the embodiment of FIGS. 13 and 14. A plurality of cuffs 27 extend from the sliding collar 25, the plurality of vertically extending tubes 13 being slidable in the cuffs 27, respectively, thus allowing the sliding collar 25 to stably slide up and down with respect to the plurality of vertically extending tubes 13.

The respective upper ends 28 of the plurality of legs 26 are each pivotally secured to the sliding collar 25 in a manner similar to that of the embodiment of FIGS. 1-4. As best seen in FIG. 14, whereas the plurality of upper mounts 48 and the plurality of lower mounts 52 were secured to the annular collar 18, each of the cuffs 27 in the embodiment of FIGS. 13 and 14 has an upper mount 48 and a lower mount 52 secured thereto. For purposes of simplification and clarity, FIG. 14 shows only a single leg 26 secured to the plurality of vertically extending tubes 13 and movable base 21. The lower ends 30' of the plurality of legs 26 are each rotatably secured to a respective one of the casters 24, as in the previous embodiment.

In this embodiment, a plurality of struts 32 are provided, each strut 32 having an upper end 34 and a lower end 36. The upper end 34 of each strut 32 is pivotally secured to a corresponding one of the legs 26, and the lower end 36 of each strut 32 is pivotally secured to the movable base 21. Mounts 64 are respectively provided on the lower ends 17 of the vertically extending tubes 13 for pivotal attachment of the lower ends 36 of the struts 32.

In the embodiment of FIGS. 1-4, the linear actuator 19 pushed the annular collar 18 downward, and the downward movement of the collar 18 caused the legs 26 to extend radially outward, increasing the area of the support base defined by the casters 24. However, in the embodiment of FIGS. 13 and 14, the linear actuator 19 is replaced by linear actuator 29, which has an upper end 31 pivotally secured to one of the legs 26, and a lower end 33 pivotally secured to the movable base 21. Extension of the linear actuator 29 causes each leg 26 to slide downward simultaneously, due to the upper end 28 of each of the legs 26 being secured to the sliding collar 25. Similarly, contraction of the linear actuator 29 causes each leg 26 to slide upward simultaneously. The linear actuator 29 may be controlled by any suitable type of user interface, such as the exemplary control box 22. For maximum extension of the legs 26, a plurality of slots or recesses 62 may be defined in the movable base 21, as shown, allowing for horizontal, or near horizontal, extension of the legs 26 in the radial direction.

Figures 6, 7:
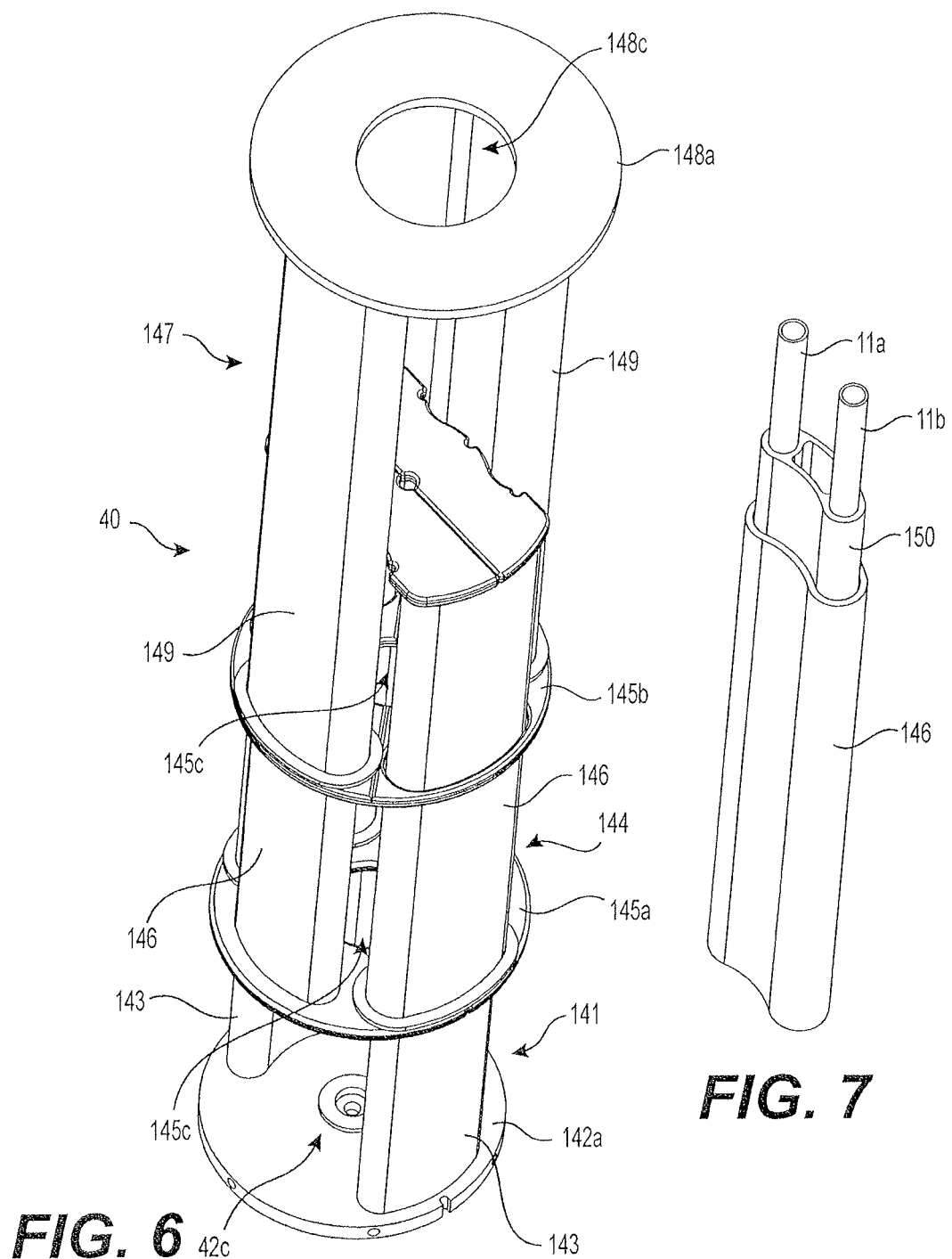
FIG. 6 is a perspective view of a telescoping cage assembly of the elevating lift of FIG. 5.
FIG. 7 is a partial perspective view of a support column of the telescoping cage assembly of FIG. 6.

The telescoping cage assembly 40 is best shown in FIG. 6. The telescoping cage assembly 40 includes a first telescoping cage 141, a second telescoping cage 144 slidably coupled to the first telescoping cage 141, and a third telescoping cage 147 slidably coupled to the second telescoping cage 144. Each of the first, second, and third telescoping cages 141, 144, 147 forms a generally cage-type configuration. The first telescoping cage 141 includes an endcap 142a, forming a base for the cage assembly 40. The endcap 142a is preferably a circular plate, although other geometrically shaped plates and/or spoked plates may be used. A central opening 42c permits parts of the drive assembly to extend therethrough. A plurality of elongated, angularly spaced, first support columns 143 extend axially from one face of the endcap 142a to form a generally cylindrical cage shape. The first support columns 143 are preferably hollow pipes of equal length.

The second telescoping cage 144 includes a first endcap 145a and a second endcap 145b spaced from the first endcap 145a. Each of the endcaps 145a, 145b is preferably a circular plate, although other geometrically shaped plates and/or spoked plates may be used. A concentric hole 145c is formed through each endcap 145a, 145b to permit parts of the drive assembly to extend therethrough and reside therein when in the normal unelevated state of FIG. 2. A plurality of elongated, angularly spaced, second support columns 146 extend axially between the first endcap 145a and the second endcap 145b to form a general, cylindrical cage shape. The second support columns 146 are preferably hollow pipes of equal length.

The third telescoping cage 147 is defined by endcap 145b and an upper endcap 148a. A central opening 148c is formed in endcap 148a to permit parts of the drive assembly to extend therethrough and reside therein when in the normal un-elevated state shown in FIG. 2. A plurality of elongated, angularly spaced, third support columns 149 extend axially between the endcap 145b and the upper endcap 148a to form a generally cylindrical cage shape. The support columns 419 are preferably hollow pipes of equal length.

Preferably, the first, second and third support columns 143, 146, 149, respectively, are constructed in similar manner. FIG. 7 illustrates one of the second support columns 146, although it should be understood that the first support columns 143 and the third support columns 149 are preferably configured in a similar manner. As noted above, each support is preferably hollow. As shown in FIG. 7, an internal sliding member 150 is disposed within the support column 146, and drive lines 11a, 11b extend through the sliding member 150. The drive lines 11a, 11b are associated with the drive train assembly that enables the telescoping cages 141, 144, 147 to reciprocate relative to one another.

Each of the first, second and third support columns 143, 146, 149 preferably is an arcuate in cross section, being configured as a segment of a circle, in order to enhance the rigidity of the structure to prevent bending or deformation. The first, second and third support columns 143, 146, 149 may be formed from extruded aluminum or the like, and the internal sliding member 150 may be formed from steel or a similar high-strength material.

Figure 5:
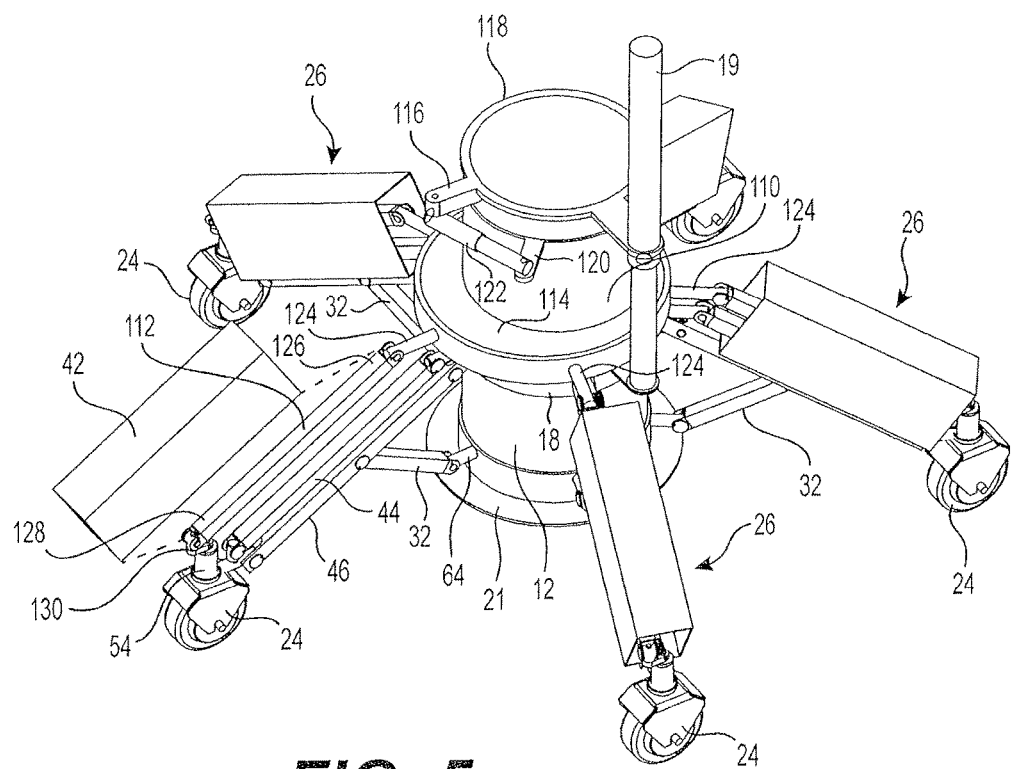
FIG. 5 is a partial perspective view of an alternative embodiment of an elevating lift with a stabilized movable base.

In the alternative embodiment shown in FIG. 5, selective and controlled rotational movement of the casters 24 is provided, all of the casters 24 being able to move simultaneously about the vertical axis defined by the housing 12 and the movable base 21. A rotating cuff 110 is mounted about the sidewall of housing 12 above the annular collar 18. The rotating cuff 110 is secured to an eccentric collar 114, which is mounted about the sidewall of housing 12 and above annular collar 18. The rotating cuff 110 is rigidly secured to the eccentric collar 114, such that rotation of the rotating cuff 110 about housing 12 causes the eccentric collar 114 to similarly rotate.

As shown in FIG. 5, a bracket 116 is secured to the upper edge 118 of the housing 12. Similarly, a bracket 120 is secured to an upper end of rotating cuff 110. A linear actuator 122 or the like is fixed to, and extends between, brackets 116, 120. Thus, through selective actuation of linear actuator 122, rotating cuff 110 and eccentric collar 114 are driven to rotate about housing 12. Similar to mounts 48, 52, an auxiliary mount 124 is secured to eccentric collar 114. The upper end 126 of an auxiliary bar 112 is pivotally secured to auxiliary mount 124, and the lower end 128 of the auxiliary bar 112 is pivotally secured to the caster support 54 of caster 24. Thus, as upper and lower bars 44, 46 and strut 32 of each leg 26 guide and drive the extension and contraction of each leg 26, the auxiliary bar 112, through its connection with eccentric collar 114, drives rotation of each leg 26 about the vertical axis. In addition to the pivotal attachment of the lower end 128 to the caster support 54, the lower end 128 is additionally rotationally adjustable through rotational linkage 130, i.e., the pivotal attachment of the lower end 128 of the auxiliary bar 112 to the caster support 54 creates rotation of the leg 26 about a horizontal axis during collapse and extension of legs 26, but further rotational freedom about the vertical axis is possible. Rotational linkage 130, which links the lower end 128 to the caster support 54, drives simultaneous rotation of all casters 24 in parallel, allowing all casters 24 to be simultaneously steered in the same direction.

Figure 8:
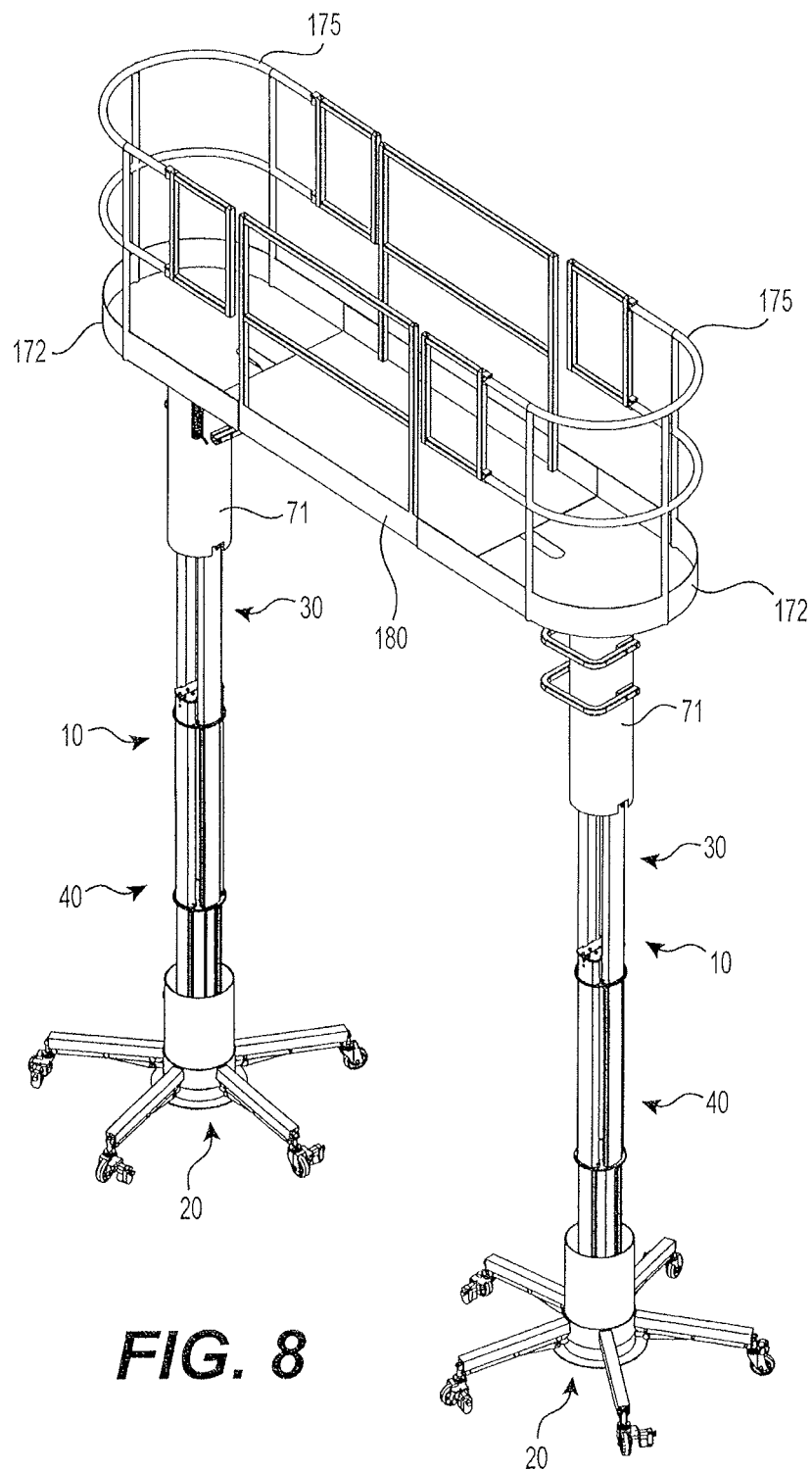
FIG. 8 is a perspective view of another alternative embodiment of the elevating lift with a stabilized movable base.
Figure 9:
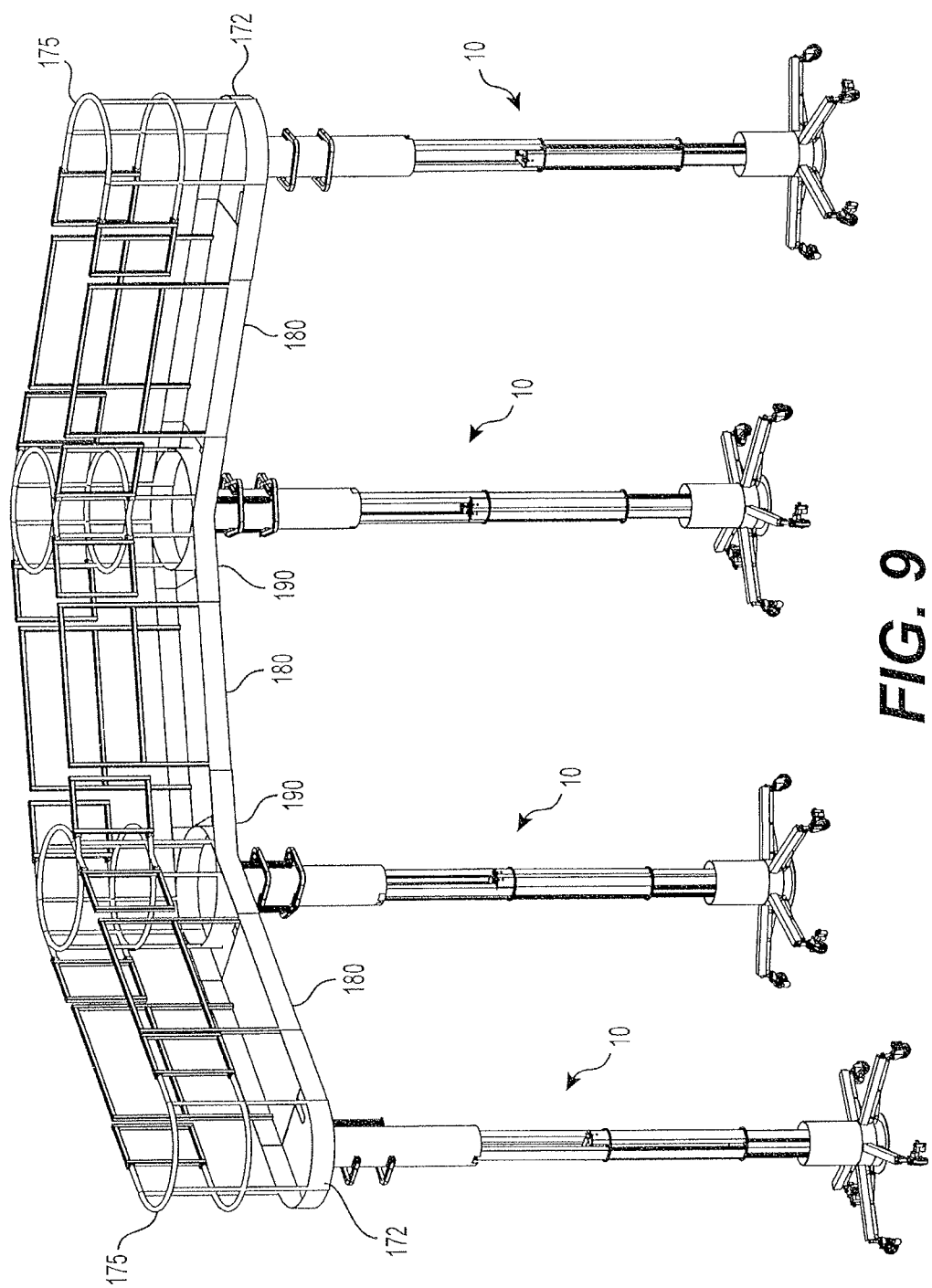
FIG. 9 is a perspective view of an alternative configuration of the elevating lift with a stabilized movable base of FIG. 8.

In the embodiment of FIG. 8, the platform 72 is replaced by an alternative platform 172. As shown, the platform 172 and corresponding guardrail assembly 175 are closed on one end and open on the other end. This allows a pair of the elevating lifts 10 to be joined together by a bridge or connector 180, providing a raised walkway with greater surface area and stability than just the single elevating lift with a stabilized movable base 10. As shown in FIG. 9, a further alternative platform 190 having a pair of opposed open ends may be used for connecting more than two of the elevating lifts 10. Here, the platforms 190 are positioned between pairs of bridges 180, although it should be understood that the platforms 190 may also be positioned directly adjacent to the platforms 172.

Figure 10:
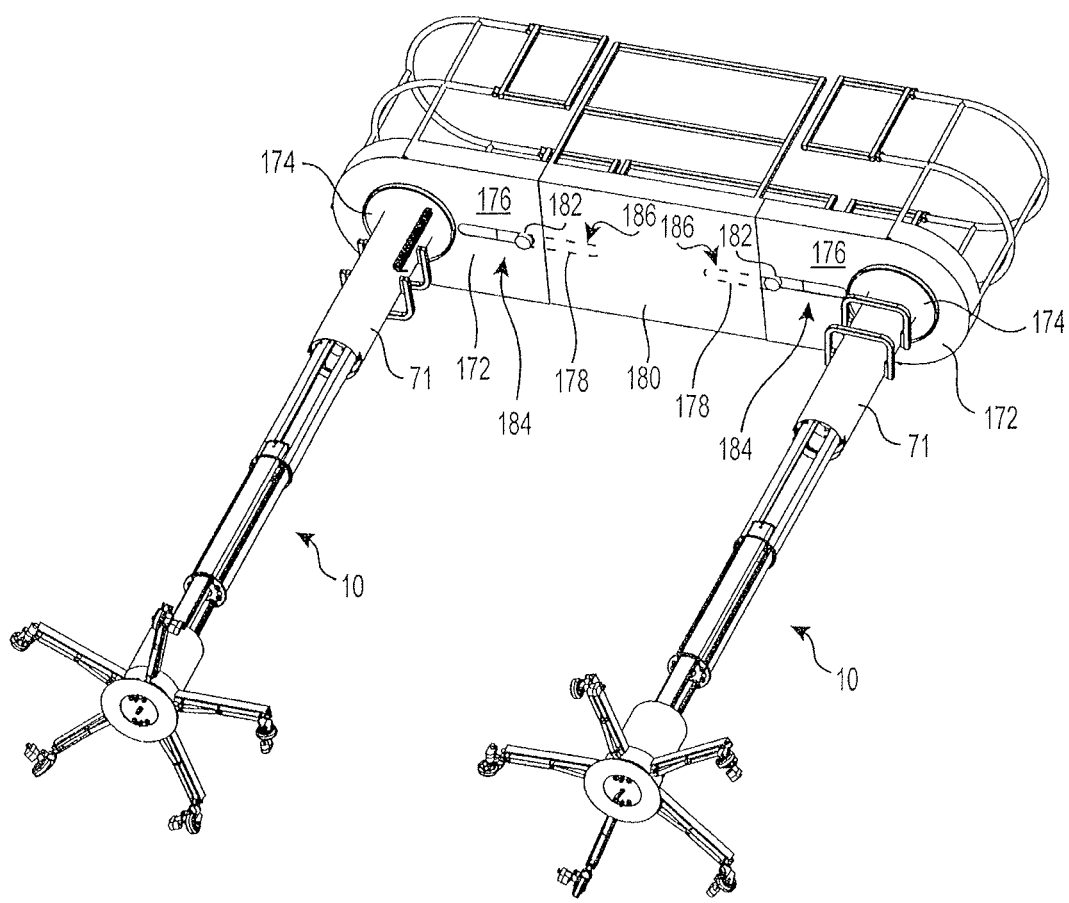
FIG. 10 is a perspective view of the elevating lift with a stabilized movable base of FIG. 8.

As shown in FIG. 10, a bearing seat 174 may be mounted on a lower surface 176 of the platform 172. This allows for selective angular adjustment of the platform 172 with respect to its corresponding platform base 71. Sliding, locking bolts 178 (adjusted through sliding movement of handle portions 182 in respective slots 184) may be extend within slots or recesses 186 formed in the bridge 180 in order to securely lock the bridge 180 in place with respect to the platforms 172. It should be understood that a similar locking system may be used with platforms 190 of FIG. 9. In the two-lift configuration of FIGS. 8 and 10, the casters 24 and bearing seat 174 of one of the elevating lifts 10 may be free to rotate, while the remaining set of casters 24 and bearing seat 174 of the other elevating lift 10 may be locked. This allows for angular positioning of one elevating lift 10 with respect to the other elevating lift 10. In the three-or-more lift configuration of FIG. 9, any desired number of elevating lifts 10 may be freely positionable with respect to any desired number of fixed elevating lifts 10.

Figure 11:
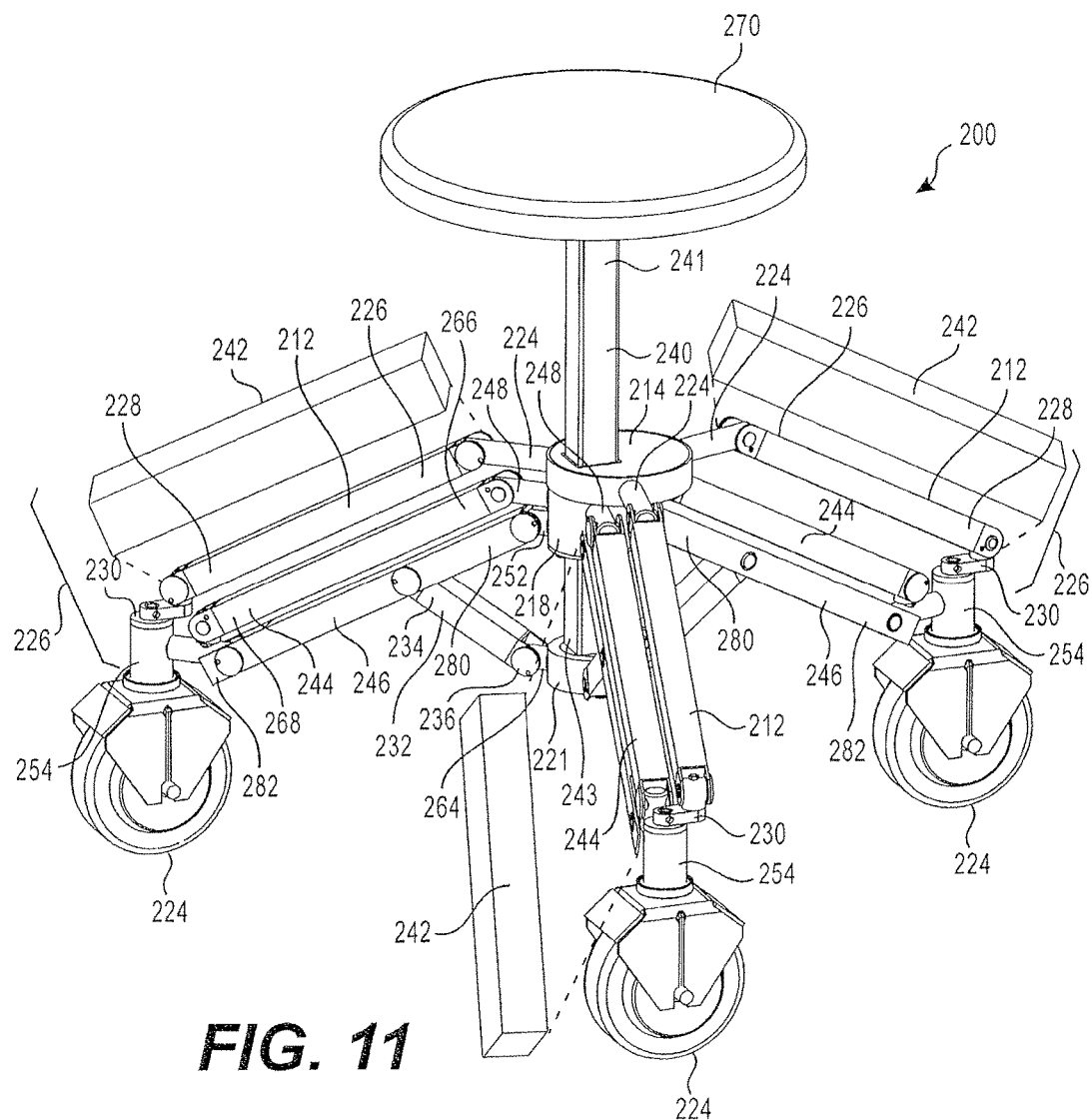
FIG. 11 is a perspective view of a stool having an elevating lift with a stabilized movable base.
Figure 12:
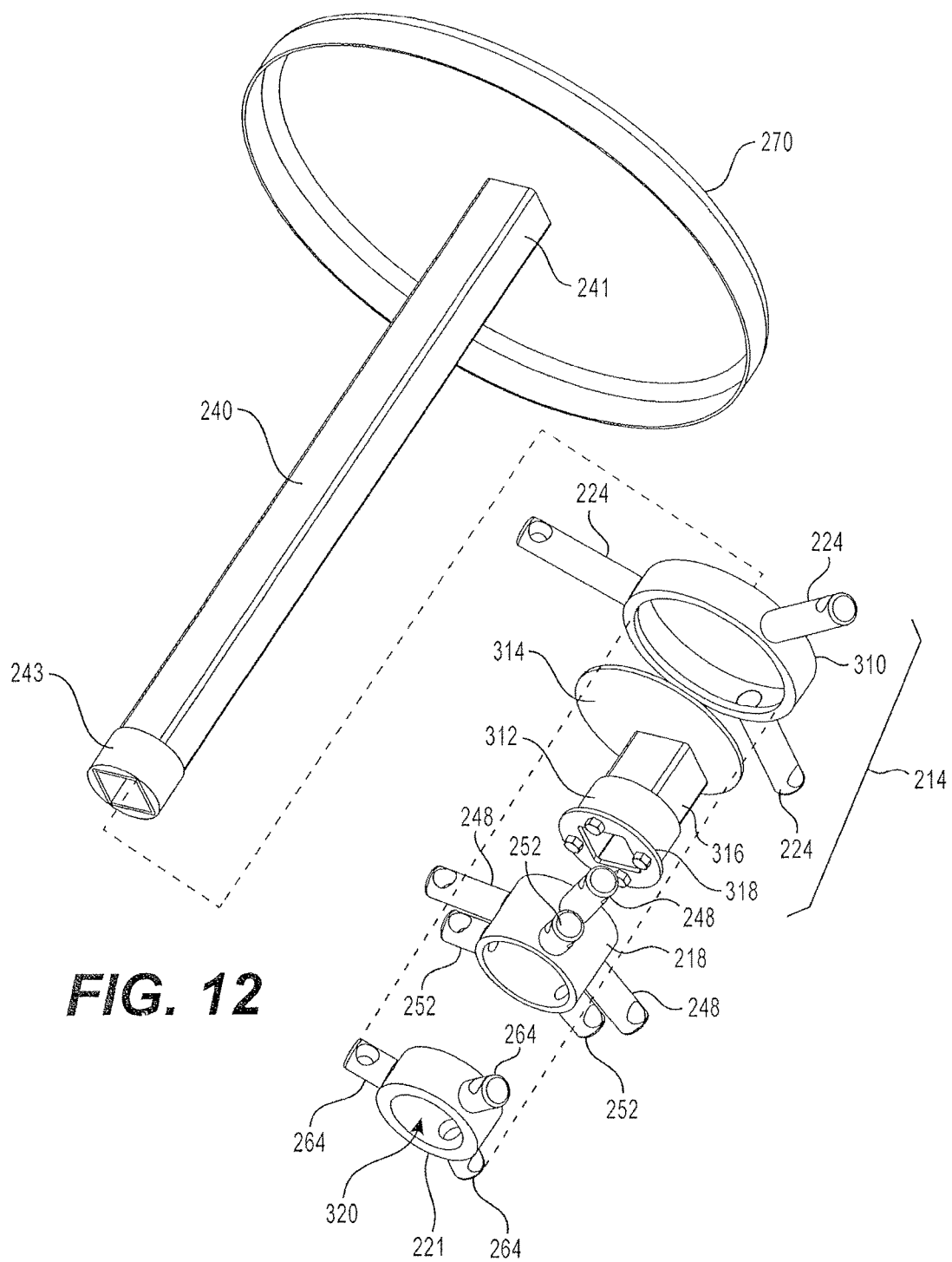
FIG. 12 is an exploded partial perspective view of the stool of FIG. 11.

FIGS. 11 and 12 show a stool 200 which uses a stabilizing base similar to that of the embodiment of the elevating lift 10 of FIG. 5. In the stool 200, the platform 70 has been replaced by a conventional stool seat 270, and the telescoping cage assembly 40 has been replaced by a vertical support 240 having opposed upper and lower ends 241, 243, respectively. The upper end 241 is secured to a lower surface of the seat 270, and the lower end 243 is secured to a movable base 221.

Similar to the previous embodiments, an annular collar 218 is slidably mounted about the vertical support 240. A plurality of upper mounts 248 and a plurality of lower mounts 252 are secured to the annular collar 218. Similar to the previous embodiments, each leg 226 includes an upper bar 244, having opposed upper and lower ends 266, 268, respectively, and a lower bar 246 having opposed upper and lower ends 280, 282, respectively. The upper end 266 of each upper bar 244 is pivotally secured to a respective one of the plurality of upper mounts 248. Similarly, the upper end 280 of each lower bar 246 is pivotally secured to a respective one of the plurality of lower mounts 252. A hollow leg housing 242 covers the upper and lower bars 244, 246 of each leg 226. Each leg 226 supports a caster 224, the lower ends 268, 282 of the upper and lower bars 244, 246 being respectively pivotally secured to a corresponding caster support 254 of each caster 224.

A plurality of struts 232, each having opposed upper and lower ends 234, 236, respectively, are further provided. The lower end 236 of each strut 232 is pivotally secured to a corresponding mount 264 on the movable base 221.

An eccentric collar 214 is slidably mounted about the vertical support 240 above the annular collar 218. A plurality of auxiliary mounts 224 are secured to the eccentric collar 214. A plurality of auxiliary bars 212 are further provided, each auxiliary bar 212 having opposed upper and lower ends 226, 228, respectively. Each upper end 226 is pivotally secured to a respective one of the plurality of auxiliary mounts 224. Each lower end 228 is pivotally secured to a respective one of the caster supports 254 of the plurality of casters 224.

In addition to the pivotal attachment of the lower end 228 to the caster support 254, the lower end 228 may be additionally rotationally adjustable through rotating connection 230, i.e., the pivotal attachment of the lower end 228 to the caster support 254 creates rotation of the leg 226 about a horizontal axis during collapse and extension of the legs 226, but further rotational freedom about the vertical axis is possible. Rotational linkage 230, which links the lower end 228 to the caster support 254, drives simultaneous rotation of all casters 224 in parallel, allowing all casters 224 to be simultaneously steered in the same direction.

As shown in FIG. 12, the eccentric collar 214 preferably includes an upper portion 310 and a lower portion 312. The upper portion 310 includes an annular ring to which the auxiliary mounts 224 are secured. The lower portion 312 includes a circular disc 314 to which hollow support 316 is attached. The circular disc 314 is disposed within the annular ring of upper portion 310. As shown, the hollow support 316 is substantially square in cross section. The lower end 243 of the vertical support 240 is circular in cross section, and the remainder of the vertical support 240 preferably is substantially square in cross section. The substantially square portion of the vertical support 240 extends through the substantially square hollow support 316 (and a corresponding substantially square opening formed through the circular disc 314). Thus, the eccentric collar 214 is angularly fixed with respect to the vertical support 240.

The lower end of the hollow support 316 has a circular rim 318 for rotational engagement with the annular collar 218. Thus, although the eccentric collar 214 is angularly fixed with respect to the vertical support 240, the eccentric collar 214 is rotatable with respect to the annular collar 218. Further, the circular lower end 243 of the vertical support 240 is extends through a circular opening 320 formed through the movable base 221, allowing the vertical support 240 to be selectively rotatable with respect to the movable base 221. Thus, manual rotation of the seat 270 and/or the upper portion of the vertical support 240 causes rotation only in the eccentric disc 214 and the auxiliary legs 212. The annular collar 218 and the movable base 221 are unaffected by manual rotation of the seat 270 and/or the upper portion of vertical support 240.

It is to be understood that the elevating lift with a stabilized movable base is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An elevating lift with a stabilized movable base, comprising:
    a base having opposed upper and lower surfaces;
    a housing mounted on the upper surface of the base, the housing having an open upper end, at least one sidewall, and a lower end;
    a telescoping cage assembly having an upper end and a lower end, the lower end being mounted on the upper surface of the base and secured within the housing;
    a platform assembly mounted on the upper end of the telescoping cage assembly;
    an annular collar slidably mounted about the housing;
    a plurality of upper mounts disposed on the annular collar;
    a plurality of lower mounts disposed on the annular collar;
    an eccentric collar slidably mounted about the housing above the annular collar;
    a rotating cuff mounted about the housing above the eccentric collar, the rotating cuff being rigidly secured to the eccentric collar, the rotating cuff being selectively rotatable about the housing;
    a plurality of auxiliary mounts disposed on the eccentric collar;
    a plurality of legs, each of the legs including:
        an upper bar having opposed upper and lower ends, the upper end of the upper bar being pivotally attached to a respective one of the upper mounts;
        a lower bar having opposed upper and lower ends, the upper end of the lower bar being pivotally attached to a respective one of the lower mounts;
        an auxiliary bar having opposed upper and lower ends, the upper end of the auxiliary bar being pivotally attached to a respective one of the auxiliary mounts; and
        a hollow leg housing covering the upper, lower, and auxiliary bars;
    a plurality of casters having swivel caster heads, each of the swivel caster heads having the lower end of one of the upper bars and the lower end of one of the lower bars pivotally attached thereto, and the lower end of one of the auxiliary bars rotatably attached thereto, whereby the upper and lower bars of each respective leg defines a four bar parallelogram linkage stabilizing the respective casters, and whereby the base is movable on the casters; and
    a plurality of struts, each of the struts having opposed upper and lower ends, the upper end of each of the struts being pivotally attached to a central portion of a corresponding one of the legs, the lower end of each of the struts being pivotally attached to the lower end of the housing.

2. The elevating lift as recited in claim 1, further comprising a linear actuator connected to said annular collar for selectively and controllably vertically translating said annular collar with respect to the housing, thereby extending and retracting the legs to stabilize the movable base.

3. The elevating lift as recited in claim 1, wherein each said caster further comprises a wheel hub, a lock disk having a plurality of radially extending slots defined therein, and a selectively activated electric motor screw linear actuator having a locking pin mounted thereon so that the screw actuator is selectively extendable into one of the slots to prevent rotation of the wheel hub and said caster.

4. The elevating lift as recited in claim 1, wherein said base has a plurality of recesses peripherally formed therein, each of the recesses being aligned with a respective one of the struts.

5. The elevating lift as recited in claim 1, further comprising an auxiliary linear actuator for selectively driving rotation of the rotating cuff with respect to the housing.

6. The elevating lift as recited in claim 5, wherein the lower end of each said auxiliary bar is further rotatable about a vertical axis and is rotatably linked to a corresponding one of the swivel caster heads, whereby the casters are steerable.

7. An elevating lift with a stabilized movable base, comprising:
   a base having opposed upper and lower surfaces;
   a cylindrical frame mounted on the upper surface of the base, the frame including a plurality of vertically extending tubes disposed in a circular array, the cylindrical frame having an open upper end and a lower end;
   a telescoping cage assembly having an upper end and a lower end, the lower end being mounted on the cylindrical frame;
   a platform assembly mounted on the upper end of the telescoping cage assembly;
   an sliding collar slidably mounted on the vertically extending tubes of the cylindrical frame;
   a plurality of upper mounts disposed on the sliding collar;
   a plurality of lower mounts disposed on the sliding collar;
   a plurality of legs, each of the legs including:
      an upper bar having opposed upper and lower ends, the upper end of the upper bar being pivotally attached to a respective one of the plurality of upper mounts;
      a lower bar having opposed upper and lower ends, the upper end of the lower bar being pivotally attached to a respective one of the plurality of lower mounts; and
      a hollow leg housing covering the upper and lower bars;
   a plurality of casters having swivel caster heads, each of the swivel caster heads having the lower end of one of the upper bars and the lower end of one of the lower bars pivotally attached thereto, whereby the upper and lower bars of each respective leg defines a four bar parallelogram linkage stabilizing the respective casters, and whereby the base is movable on the casters; and
   a plurality of struts having opposed upper and lower ends, the upper end of each of the struts being pivotally attached to a central portion of a corresponding one of the plurality of legs, the lower end of each of the struts being pivotally attached to the lower end of the cylindrical frame.

8. The elevating lift as recited in claim 7, further comprising a linear actuator having a first end and a second end, the first end being pivotally attached to one of the legs, and the second end being pivotally attached to the base.

9. The elevating lift as recited in claim 8, wherein each said caster further comprises a wheel hub, a lock disk having a plurality of radially extending slots defined therein, and a selectively activated electric motor screw linear actuator having a locking pin mounted thereon so that the screw actuator is selectively extendable into one of the slots to prevent rotation of the wheel hub and said caster.

10. The elevating lift as recited in claim 8, wherein said base has a plurality of recesses peripherally formed therein, each of the recesses being aligned with a respective one of the struts.

* * * * *